(12) United States Patent
Grosser, Jr. et al.

(10) Patent No.: US 8,730,963 B1
(45) Date of Patent: May 20, 2014

(54) METHODS, SYSTEMS, AND COMPUTER READABLE MEDIA FOR IMPROVED MULTI-SWITCH LINK AGGREGATION GROUP (MLAG) CONVERGENCE

(75) Inventors: Donald B. Grosser, Jr., Apex, NC (US); Shankara Ramamurthy, Chennai (IN)

(73) Assignee: Extreme Networks, Inc., Santa Clara, CA (US)

( * ) Notice: Subject to any disclaimer, the term of this patent is extended or adjusted under 35 U.S.C. 154(b) by 319 days.

(21) Appl. No.: 12/977,771

(22) Filed: Dec. 23, 2010

Related U.S. Application Data

(60) Provisional application No. 61/415,629, filed on Nov. 19, 2010.

(51) Int. Cl.
*H04L 12/28* (2006.01)
*H04L 12/58* (2006.01)

(52) U.S. Cl.
USPC ........... 370/392; 370/220; 370/221; 370/219; 370/227; 370/228; 370/401; 370/410; 370/235; 370/386

(58) Field of Classification Search
None
See application file for complete search history.

(56) References Cited

U.S. PATENT DOCUMENTS

| 7,173,934 | B2 * | 2/2007 | Lapuh et al. | 370/392 |
| 2008/0112323 | A1 * | 5/2008 | Agmon et al. | 370/235 |
| 2012/0054850 | A1 * | 3/2012 | Bhardwaj et al. | 726/12 |

OTHER PUBLICATIONS

"Split Multi-link Trunking," Wikipedia http://en.wikipedia.orq/wiki/Split_multi-link_trunking, pp. 1-4 (Publication date unknown).

* cited by examiner

*Primary Examiner* — Ian N Moore
*Assistant Examiner* — Eric H Wang
(74) *Attorney, Agent, or Firm* — Jenkins, Wilson, Taylor & Hunt, P.A.

(57) ABSTRACT

The subject matter described herein includes methods, systems, and computer readable media for improved multi-switch link aggregation group (MLAG) convergence. According to one aspect of the subject matter described herein, a system for improved multi-switch link aggregation group (MLAG) convergence is provided. The system includes a packet forwarding device. The packet forwarding device includes a packet processor for receiving a packet and determining that the packet is destined for a port of the packet forwarding device associated with an MLAG group. The packet forwarding device further includes an MLAG module associated with the packet processor for determining that the port is inactive, and in response to determining that the port is inactive, performing a convergence operation, wherein the convergence operation includes redirecting, using a redirection filter, the received packet towards an active port associated with the MLAG group.

15 Claims, 7 Drawing Sheets

METHODS, SYSTEMS, AND COMPUTER READABLE MEDIA FOR IMPROVED MULTI-SWITCH LINK AGGREGATION GROUP (MLAG) CONVERGENCE

PRIORITY CLAIM

This application claims the benefit of U.S. Provisional Patent Application Ser. No. 61/415,629 filed Nov. 19, 2010; the disclosure of which is incorporated herein by reference in its entirety.

TECHNICAL FIELD

The subject matter described herein relates to packet forwarding devices. More particularly, the subject matter described herein relates to packet forwarding devices with improved multi-switch link aggregation group (MLAG) convergence.

BACKGROUND

A network, such as an Internet protocol (IP)-based network, may have redundant links or connections between nodes. For example, a server may be connected to multiple routers. While nodes may be connected via multiple links, network configuration may prevent the multiple links from being used at the same time. For example, in a local area network (LAN), packets may be forwarded by a layer 2 packet forwarding device. To prevent loops that cause broadcast radiation or a broadcast storm (e.g., numerous copies of packets being continuously forwarded throughout the network), an appropriate layer 2 protocol, such as spanning tree protocol (STP), may be used to create a loop-free topology. For example, STP may be used to create a spanning tree within a network of connected layer 2 packet forwarding devices. In particular, STP may block redundant links such that a single active path between any two network nodes is used for forwarding packets.

While STP and similar protocols prevent loops and loop-related problems, the redundant links are effectively dormant unless a currently active link fails or becomes inactive at which time the redundant link may become active. Thus, for a network where every node is connected to every other node by two links, STP and similar protocols typically may result in an inefficient use of available resources (e.g., available network bandwidth) due to loop preventing blocking.

One solution for this inefficient use of available resources is to use additional connection and link layer logic in the network. For example, multiple physical links associated with a single device can be treated as a single logical connection. In a second example, multiple physical links associated with a plurality of devices can be treated as a single logical connection. Using logical connections and associated link layer logic may prevent loop-related problems and may allow redundant links to be used in forwarding packets. For example, packets may be load shared among multiple links of a logical connection for reaching a destination. As such, a logical connection may allow resources to be more efficiently utilized. However, problems may arise when one or more links in a logical connection fails, e.g., packets forwarded via a failed link may not reached their destination.

Conventionally, when a logical connection associated with ports of a plurality of devices experiences a failure, one or more of the devices may perform a convergence operation. A conventional convergence operation may include deleting an entry (e.g., a media access control (MAC) address and port information) associated with the failed or inactive link in a forwarding database, determining an available link associated with the logical connection and related port information for using the available link, and replacing, in the forwarding database, the deleted entry with an entry including the port information for using the available link.

One shortcoming associated with the convergence operation is that as the number of forwarding databases entries increases, the amount of time to complete the convergence operation increases proportionately. For example, the time to perform a convergence operation as described above can increase linearly with the number of forwarding database entries needing to be deleted and re-learned. Thus, for a database having a large number of entries, the time it takes to complete a convergence operation may result in various applications and services (e.g., real-time or near real-time applications) experiencing problems or even failure.

Accordingly, in light of these difficulties, there exists a need for methods, systems, and computer readable media for improved multi-switch link aggregation group (MLAG) convergence.

SUMMARY

The subject matter described herein includes methods, systems, and computer readable media for improved multi-switch link aggregation group (MLAG) convergence. According to one aspect of the subject matter described herein, a system for improved MLAG convergence is provided. The system includes a packet forwarding device. The packet forwarding device includes a packet processor for receiving a packet and determining that the packet is destined for a port of the packet forwarding device associated with an MLAG. The packet forwarding device further includes an MLAG module associated with the packet processor for determining that the port is inactive, and in response to determining that the port is inactive, performing a convergence operation, wherein the convergence operation includes redirecting, using a redirection filter, the received packet towards an active port associated with the MLAG.

The term "lookup" is intended to refer to any type of operation for selecting particular data from a set of data. For example, a lookup could include a hash operation where a hash value is computed based on a selection parameter or parameters, and the hash value is used to select data of interest from a data set.

The term "link" is intended to refer to any type of connection between devices. For example, a link may include one or more communications media, such as a wire, cable, fiber optics, radio, or other medium. In a second example, a link may also include a trunk and/or logical connection.

The term "multi-switch link aggregation group (MLAG)" is intended to refer to a link aggregation technique for associating ports of plural devices with a logical link. For example, MLAG may include techniques for link aggregation involving bridges, routers, servers, and/or other devices.

The terms "function" or "module" is intended to refer to hardware in combination with software and/or firmware for implementing features described herein.

The subject matter described herein for improved MLAG convergence can be implemented using a non-transitory computer readable medium having stored thereon executable instructions that when executed by the processor of a computer control the computer to perform steps. Exemplary computer readable media for implementing the subject matter described herein may include chip memory devices, disk memory devices, programmable logical devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be described with reference to the accompanying drawings of which.

DETAILED DESCRIPTION

Figure 1:
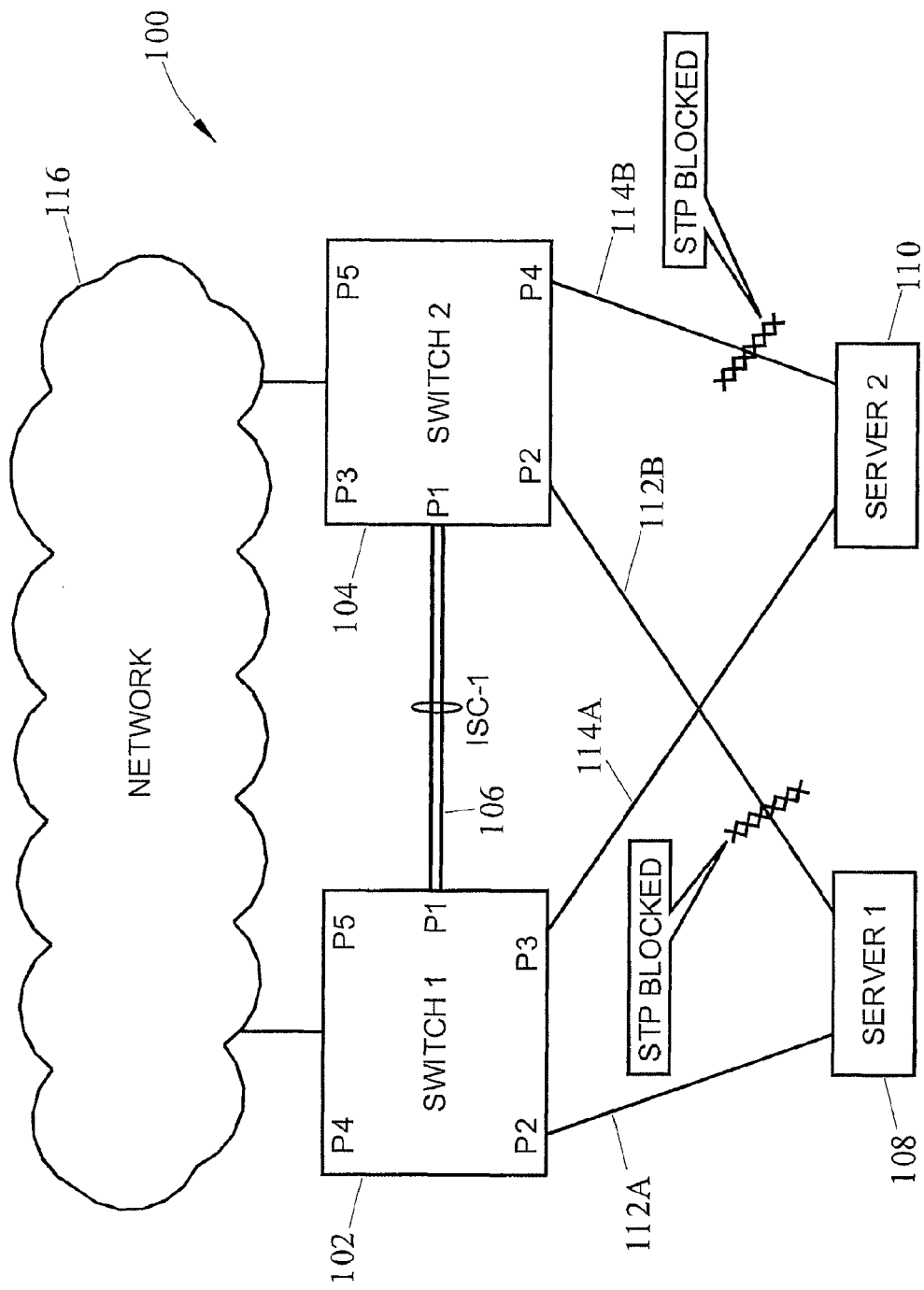
FIG. 1 is a block diagram illustrating an exemplary network having redundant links between devices.

The subject matter described herein includes methods, systems, and computer readable media for improved MLAG convergence. FIG. 1 is a block diagram illustrating an exemplary network having redundant links between devices. Referring to FIG. 1, exemplary network 100 may include one or more networks, e.g., a local area networks (LAN) and an Internet protocol (IP) network. In particular, network 100 may include a network 116, e.g., a portion of an Ethernet network, and various devices, such as switch 1 102, switch 2 104, and server 1 108, and server 2 110.

Switch 1 102 and switch 2 104 may be packet forwarding devices connected to network 116. In one embodiment, switch 1 102 and switch 2 104 may have layer 2 switching and layer 3 packet forwarding capabilities, where layers 2 and 3 refer to the corresponding layers in the OSI protocol stack. For example, a packet forwarding device may perform layer 2 switching functions and layer 3 routing functions. Switch 1 102 and switch 2 104 may be connected via an inter-switch connection (ISO), e.g., ISC-1 106. In one embodiment, ISC-1 106 may be a link, e.g., a trunk, capable of providing communications between the two switches. Switch 1 102 and switch 2 104 may also be connected to server 1 108 and server 2 110. For example, switch 1 102 may be connected to server 1 108 via link 112A and may be connected to server 2 110 via link 114A. Switch 2 104 may be connected to server 1 108 via link 112B and may be connected to server 2 110 via link 114B. Server 1 108 and server 2 110 may provide services to one or more nodes in network 116.

In one embodiment, network 100, or a portion or segment thereof, may use a layer 2 or link layer network protocol for determining a loop-free topology. For example, in a legacy data network, redundant connections may connect top of rack (TOR) switches to end of row (EOR) switches. In such an environment, layer 2 protocols, such as spanning tree protocol (STP), may result in a loss of significant available bandwidth due to STP blocking. For example, using STP, switch 1 102 and switch 2 104 may exchange information in bridge protocol data units (BPDUs). The information exchanged may include information about bridge IDs and root path costs. Using this information, a spanning tree may be calculated such that a single active path between any two nodes is used for forwarding packets. If a link is not part of the spanning tree, switch, using STP, may block usage of the link to prevent loops and loop-related problems.

As illustrated in FIG. 1, using STP or a similar protocol, switch 2 104 may block usage of links 112B and 114B so that a loop-free topology is implemented. In one embodiment, STP blocking may include marking port 2 and port 4 of switch 2 104 as inactive or blocked, e.g., in each switch's respective forwarding database. While FIG. 1 shows links 112B and 114B as blocked, it will be appreciated that in other embodiments or using other protocols, different links may be blocked, e.g., links 112A and 114A. Further, it will be appreciated that blocked links may become active if the current active links fail or becoming inactive.

Figure 2:
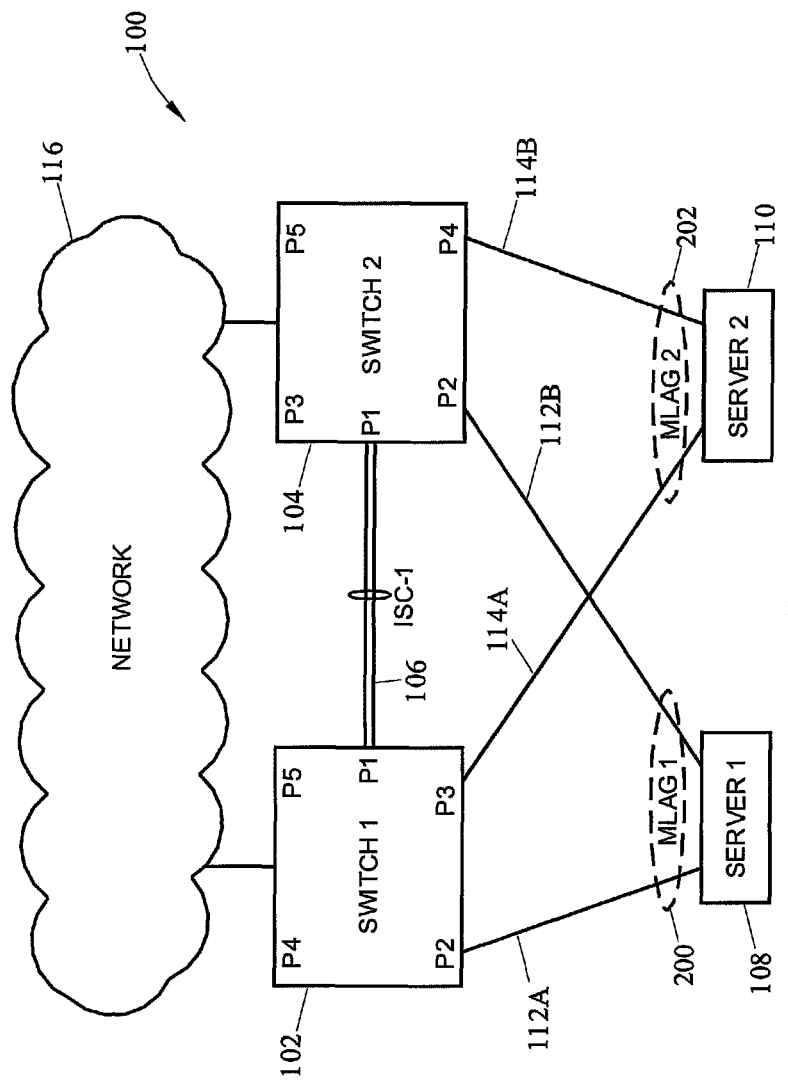
FIG. 2 is a block diagram illustrating multi-switch link aggregation groups for redundant links between devices.

FIG. 2 is a block diagram illustrating multi-switch link aggregation groups for redundant links between devices. Referring to FIG. 2, a link layer logical connection implementation, known as multi-switch link aggregation groups (MLAGs), is used for aggregating links between devices of network 100. MLAGs allow links associated with two switches (e.g., links 112A and 112B) to be treated as a single logical link. For example, as shown in FIG. 2, MLAG 1 200 may include links 112A and 112B and MLAG 2 202 may include links 114A and 114B. From a packet forwarding device's perspective (e.g., switch 1 102), an MLAG may be represented by ports of multiple switches that are associated with a single logical connection, such as switch 1: port 2 and switch 2: port 2 with MLAG 1 200 and switch 1: port 3 and switch 2: port 4 with MLAG 2 202.

In one embodiment, an MLAG implementation may optimize bandwidth utilization by blocking particular traffic from transmission via particular ports while allowing other traffic. For example, a MLAG implementation may block only duplicate traffic and other traffic that may create network loops from transmission instead of blocking port usage. In one embodiment, a MLAG implementation may use one or more connection assumptions for optimizing bandwidth. In this embodiment, one assumption that may be used is that switch ports associated with an MLAG (i.e., MLAG ports) connect to the same device (e.g., server 1 108) or MLAG ports connect to another set of networking devices provisioned with a corresponding MLAG configuration (e.g., MLAG ports that connect to server 1 108 and server 2 110, where the servers have an interconnection similar to ISC-1 106 and are configured to use the interconnection for MLAG traffic as described herein).

Another assumption that may be used is MLAG traffic (e.g., a packet associated with MLAG link or MLAG port) received at an MLAG node (e.g., switch 2 104) is forwarded via local ports at the receiving MLAG node (e.g., port 2 (P2) of switch 2 104). That is, it may be assumed that an MLAG node handles MLAG traffic locally whenever possible (e.g., during normal operation). Since it may be assumed that a MLAG node forwards MLAG traffic via local ports whenever possible, it may also be assumed that MLAG traffic forwarded, during normal operation (e.g., during a steady state with no MLAG failures), from the MLAG node to a second MLAG node is duplicate traffic and can be blocked using ISC blocking filters or rules. For example, network traffic received from an MLAG node transmitted via an ISC to a second MLAG node may be blocked or prevented transmission via egress ports of the second MLAG node during normal operation.

By making the above assumptions, an MLAG implementation may efficiently use available bandwidth while still providing layer-2 redundancy. For example, a layer 2 protocol (e.g., STP) may be used for ensuring a loop-free topology and redundant links may be more efficiently utilized. For instance, traffic destined for server 1 108 and server 2 110 may be load shared among links of an appropriate MLAG, thereby increasing available bandwidth of network 100.

As stated above, it will be appreciated that a link may include multiple communications media, e.g., cable, lines, or fiber optic strands. Moreover, a link may be associated with other forms of link aggregation. For example, link 112A may be a trunk connection and may use a link aggregation technique for treating the media of the trunk connection as a single logical connection. In a second example, two or more links (e.g., link 112A and 112B) of an MLAG may include trunk connections.

Figure 3:
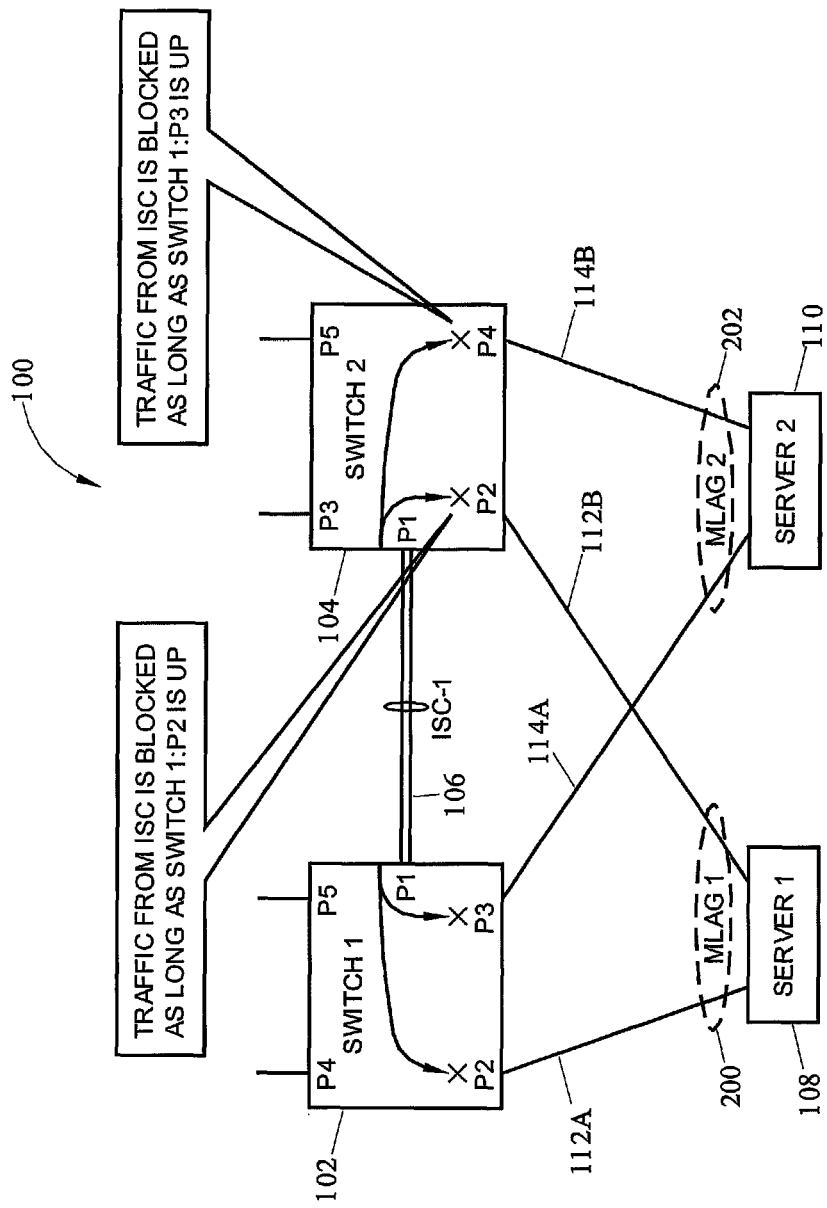
FIG. 3 is a block diagram illustrating packet forwarding using multi-switch link aggregation groups according to an embodiment of the subject matter described herein.

FIG. 3 is a block diagram illustrating packet forwarding using multi-switch link aggregation groups according to an embodiment of the subject matter described herein. Referring to FIG. 3, an MLAG implementation is used for aggregating links between devices of network 100. In this embodiment, all links are active and may be used in forwarding traffic from network 116 to either server 1 108 and server 2 110.

In one embodiment, switch 1 102 and switch 2 104 may include MLAG information and/or logic (e.g., at an MLAG module). In one embodiment, switch 1 102 and switch 2 104 may receive and/or exchange control packets (e.g., link aggregation control protocol (LACP) packets, user datagram protocol (UDP) packets, and/or STP packets) for determining status and other information related to MLAG configuration. Based on this information, forwarding information may be determined and exchanged. For example, switch 1 102 and switch 2 104 may use a UDP helo protocol via an ISC (e.g., ISC-1 106) for exchanging parameters, such as parameters relating to operation status of MLAG ports or links.

Switch 1 102 and switch 2 104 may also use a transport control protocol (TCP) for check pointing, inspecting, and/or updating database information. For example, if a packet is received at switch 1 102 and a MAC forwarding database entry is learned for an MLAG port, database information and/or other information may be sent to switch 2 104. The information may be used for updating switch 2 104 with an entry associated with the MLAG.

Using this technique, associated MLAG nodes (e.g., switch 1 102 and switch 1 104) may learn MAC addresses for MLAG ports in tandem. For example, a forwarding database at switch 1 102 may include an entry for forwarding packets addressed to a MAC address (e.g., of server 1 108) via port 2 (P2) of switch 1 102. Similarly, a forwarding database at switch 2 104 may include an entry for forwarding packets addressed to the same MAC address (e.g., of server 1 108) via port 2 (P2) of switch 2 104.

As shown in the embodiment in FIG. 3, network 100 is depicted in an MLAG steady state, e.g., all MLAG peer ports are active and no associated links are experiencing problems. While in an MLAG steady state, traffic associated with an MLAG group may be forwarded via a local port, e.g., a port of a receiving MLAG node. For example, a packet destined for server 2 110 may be received at switch 1 102. Switch 1 102 may forward this packet towards server 2 110 via port 3 (P3) of switch 1 102. In a second example, a packet destined for server 2 110 may be received at switch 2 104. Switch 2 104 may forward this packet towards server 2 110 via port 4 (P4) of switch 2 104.

In one embodiment, during an MLAG steady state, traffic traversing ISC-106 may be assumed to have already been forwarded to a peer MLAG port and, as such, the traffic may be subjected to one or more ISC blocking filters. For example, as shown in the embodiment of FIG. 3, traffic sent via ISC-1 106 from switch 1 102 destined for server 1 108 may be blocked from transmission via port 2 (P2) of switch 2 104. Likewise, traffic sent via ISC-1 106 from switch 1 102 destined for server 2 110 may be blocked from transmission via port 4 (P4) of switch 2 104.

While not shown in FIG. 3, it will be appreciated that traffic sent via ISC-1 106 from switch 2 104 may also be subjected to one or more ISC blocking filters. For example, during an MLAG steady state, traffic sent via ISC-1 106 from switch 2 104 destined for server 1 108 may be blocked from transmission via port 2 (P2) of switch 1 102. Likewise, traffic sent via ISC-1 106 from switch 2 104 destined for server 2 110 may be blocked from transmission via port 3 (P3) of switch 1 102.

Figure 4:
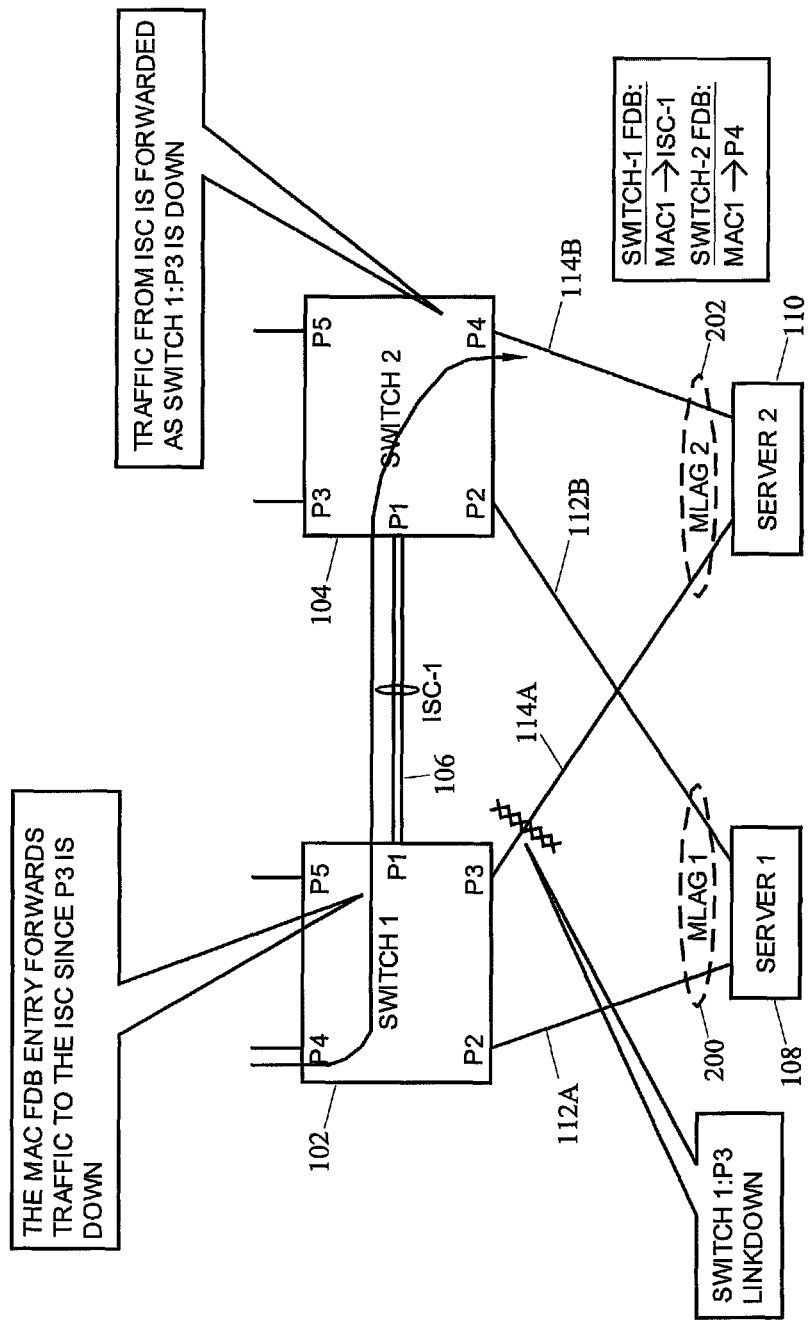
FIG. 4 is a block diagram illustrating a conventional MLAG convergence operation.

FIG. 4 is a block diagram illustrating a conventional MLAG convergence operation. Referring to FIG. 4, an MLAG implementation is used for aggregating links between devices of network 100. Additionally, a conventional convergence operation is depicted in response to link 114A becoming inactive (e.g., fails).

As illustrated in FIG. 4, a link or port failure associated with an MLAG may occur. For example, control or keep-alive packets (e.g., UPD helo packets) may indicate to switch 1 102 that link 114A is down or otherwise inactive. In response to determining an MLAG link and/or MLAG port failure, a convergence operation may be initiated. For example, in response to an MLAG link becoming inactive, switch 1 102 may mark port 3 (P3) of switch 1 102 as blocked or inactive and may initiate a convergence operation.

The convergence operation may include modifying and/or removing one or more ISC blocking filters, moving entries for traffic associated with a failed MLAG port (e.g., to a location or memory for restoring entries after an MLAG port becomes active again), deleting entries for traffic associated with a failed MLAG port, and/or re-learning entries for traffic associated with a failed MLAG port. For example, during a convergence operation, each MAC forwarding database entry associated with an inactive port may be flushed and MAC addresses may be re-learned for an active MLAG port.

In FIG. 4, simplified MAC forwarding database entries are depicted. The forwarding databases depict MAC addresses and related egress port information after a convergence operation has completed. In particular, a forwarding database entry of switch 1 102 is depicted. The forwarding database entry of switch 1 102 indicates that traffic addressed to MAC1 is to be forwarded over ISC-1 106 via port 1 (P1). A forwarding database entry of switch 2 104 is also depicted. The forwarding database entry of switch 2 104 indicates that traffic addressed to MAC1 is to be forwarded via port 4 (P4).

Packet forwarding using the MAC entries described above is represented by an arrow in FIG. 4. As shown in this illustrated example, a packet addressed to a MAC address (e.g., MAC1 of server 2 110) may be received at switch 1 102 while an MLAG port is inactive. Switch 1 102 may perform a forwarding database lookup using a first forwarding database for determining an egress port. Using the egress port identified by the lookup, switch 1 102 may forward the packet over ISC-1 106 via port 1 (P1) to switch 2 104. Switch 2 104 may receive the packet. Switch 2 104 may perform a forwarding database lookup using a second forwarding database. Using the egress port identified by the lookup, switch 2 104 may forward the packet via port 4 (P4) of switch 2 104 towards server 2 110.

As stated above, a convergence operation, e.g., moving, flushing, and/or of re-learning database entries associated with inactive MLAG ports, may require a significant amount of time to complete. For example, in a relatively large network, a hundred thousand (100K) different entries may be associated with a failed MLAG port. The time it takes to move (e.g., copy data to another location for later use), flush and/or re-learn 100K entries may be substantial. Moreover, flushing and re-learning MAC entries may cause substantial packet flooding in the network and other issues. For example, latency-sensitive applications or other services may fail or report errors during this convergence operation.

Accordingly, to prevent multiple problems during an MLAG failure, it is beneficial to implement an improved MLAG convergence operation that is scalable and generally faster to perform. Moreover, an improved MLAG convergence operation that allows for an efficient failback (e.g., an operation to restore MLAG configuration to a state before a convergence operation) is also beneficial.

Figure 5:
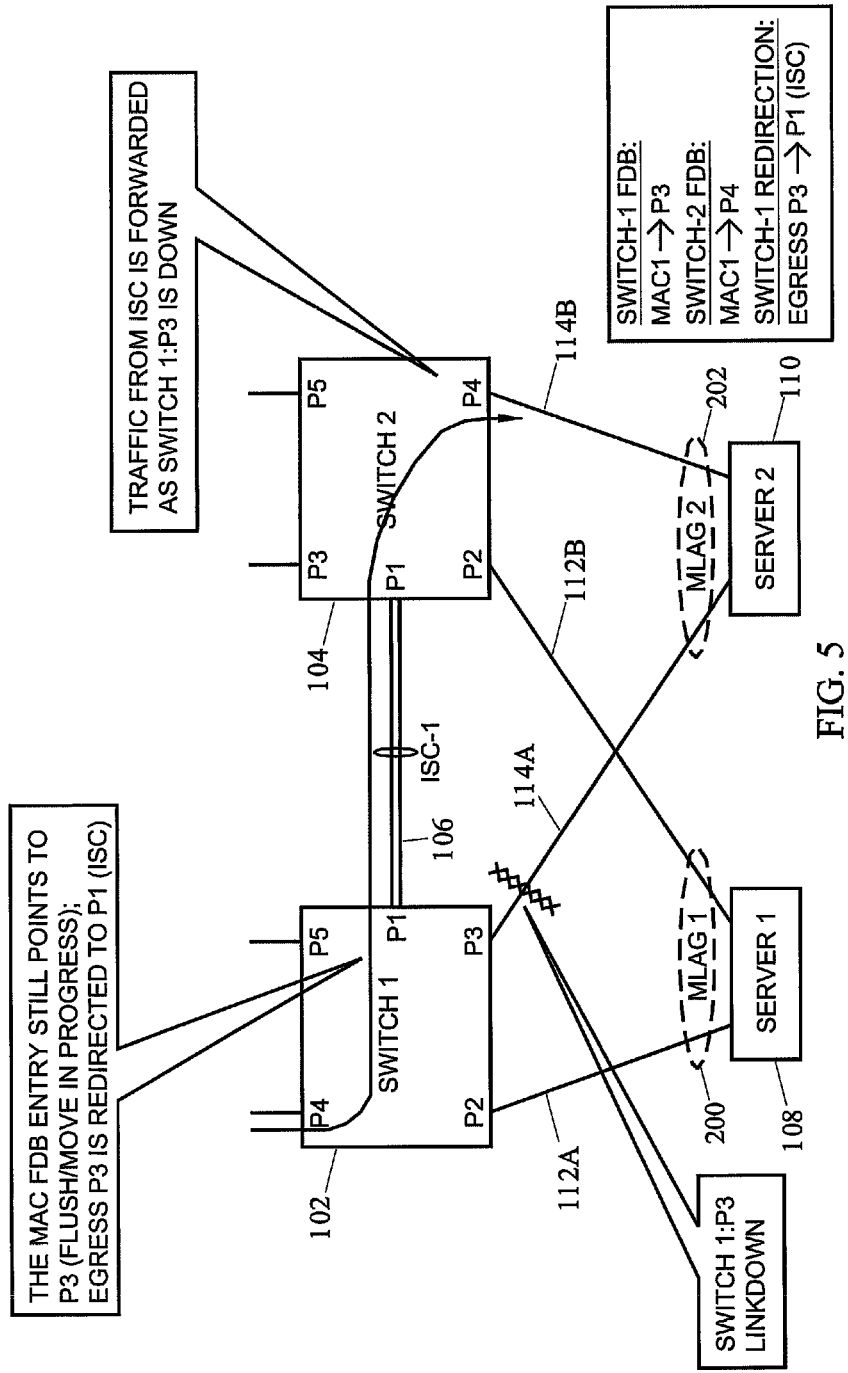
FIG. 5 is a block diagram illustrating an improved MLAG convergence operation according to an embodiment of the subject matter described herein.

FIG. 5 is a block diagram illustrating an improved MLAG convergence operation according to an embodiment of the subject matter described herein. Referring to FIG. 5, an MLAG implementation is used for aggregating links between devices of network 100. In this embodiment, a redirection filter (e.g., an access control list (ACL) filter) is used during an improved convergence operation.

In one embodiment, a link or port failure associated with an MLAG may be detected. For example, control or keep-alive packets (e.g., UPD helo packets) may indicate to switch 1 102 that link 114A is down or otherwise inactive. In response to determining an MLAG link and/or MLAG port failure, a convergence operation may be initiated. For example, in response to an MLAG link becoming inactive, switch 1 102 may mark port 3 (P3) of switch 1 102 as blocked or inactive and may initiate an improved convergence operation.

In one embodiment, an improved convergence operation may include redirecting, using a redirection filter, a received packet associated with an inactive port towards an active port associated with the MLAG group. For example, when a failure is detected, switch 1 102, or a component therein (e.g., a switch management module (SMM), may generate a redirection filter for redirecting traffic associated with an inactive MLAG port. The redirection filter may associate the inactive MLAG port with an active, alternate port. For example, as shown in FIG. 5, the redirection filter may indicate that traffic associated with port 3 (P3) of switch 1 102 is to be redirected through ISC-1 106 via port 1 (P1) of switch 1 102.

In one embodiment, a redirection filter may include information for sending a packet via an inter-switch connection (ISC) from a first packet forwarding device (e.g., switch 1 102) to a second packet forwarding device (e.g., switch 2 104). The second packet forwarding device may forward, using its forwarding database information, the packet via an active port associated with the MLAG group (e.g., port 4 (P4) of switch 2 104).

In one embodiment, a redirection filter may be an access control list (ACL) filter. Generally, an ACL is a security mechanism that may include multiple filters. Each filter may include criteria used to determine whether particular traffic is permitted to use or access a resource. For example, an ACL filter may be a rule or other information used in identifying traffic that is permitted or denied access to a resource (e.g., a port, a VLAN, or a node). In this embodiment, an ACL filter may be used for convergence operation purposes. For example, an ACL filter may include information used in forwarding or redirecting a packet associated with an inactive MLAG port. For example, an ACL filter may include criteria that if met causes traffic associated with an inactive MLAG port to be redirected to an active MLAG port.

In one embodiment, an ACL filter may be examined after a forwarding database lookup. For example, when a packet is received at a packet forwarding device (e.g., switch 1 102), a forwarding database lookup may be performed using a destination address (e.g., a MAC address). The lookup may return port information that identifies an egress port, e.g., a port that may be used for sending the packet towards a destination. After performing the lookup for a packet, returned port information may be used to identify an associated ACL filter. For example, an ACL filter may include match criteria or information that is to be compared to information returned by a forwarding database lookup for a packet. If the ACL match information matches an egress port identified by the forwarding database lookup, the ACL filter may be used in forwarding the packet.

In one embodiment, the associated redirection filter may be used to override or ignore information associated with a forwarding database lookup, such as returned port information. For example, if a redirection filter is associated with an egress port identified by a forwarding database lookup, a switch (e.g., switch 1 102) may use the associated redirection filter to forward a packet regardless of the egress port identified by the forwarding database lookup.

The redirection filter may be used to redirect traffic until a reverting event occurs. A reverting event may include any event which makes using a redirection filter for redirecting MLAG traffic unnecessary or undesirable. For example, a reverting event may include an inactive port becoming active, a forwarding database move operation, a forwarding database flush operation completing, or a forwarding database learn operation completing. In one embodiment, in response to a reverting event, a redirection filter may be removed or otherwise not enforced such that traffic is forwarded to the previously inactive port. For example, after an MLAG link becomes operational, switch 1 102 may remove or uninstall using the ACL redirection filter.

A packet forwarding device may use a redirection filter in lieu of performing one or more steps of a conventional convergence operation. For example, a packet forwarding device may perform redirection in lieu of at least one of a forwarding database flush operation, a forwarding database move operation, and a forwarding database learn operation. For instance, switch 1 102 may use a redirection filter in conjunction with performing one or more conventional convergence steps. For example, switch 1 102 may apply a redirection filter for quickly redirecting packets away from an inactive port towards an active port until one or more MAC database entries are flushed and/or learned.

In another example, switch 1 102 may apply a redirection filter instead of flushing and re-learning MAC entries associated with an inactive MLAG link. For example, switch 1 102 may apply a redirection filter and not change forwarding database entries associated with an inactive MLAG port. That is, instead of flushing MAC entries associated with an inactive MLAG port and re-learning MAC entries with an active port during a conventional convergence operation, a forwarding database may maintain entries associated with an inactive MLAG port.

In one embodiment, where a redirection filter typically affects all traffic for an inactive MLAG port and forwarding database information remains unchanged, an improved MLAG convergence operation may be significantly more efficient than a conventional convergence operation. In particular, for environments having a large number of MAC entries associated with an inactive MLAG port, the time to apply a redirection filter for affecting all traffic associated with the inactive MLAG port is significantly less than the time it takes to flush and re-learn MAC entries affected by the inactive MLAG port.

In this embodiment, a failback operation (e.g., an operation to restore MLAG configuration to a state before a convergence operation) may also be significantly more efficient than a failback operation for a conventional convergence operation. As stated above, a conventional convergence operation may flush and re-learn MAC entries associated with an inactive MLAG port. As such, a corresponding failback operation may include flushing and re-learning MAC entries associated with a previously inactive MLAG port. In contrast, in an example using an improved convergence operation where MAC entries associated with an inactive MLAG port are not re-learned but instead are left unchanged in a forwarding database, when an inactive MLAG port becomes active, switch 1 102 may remove or uninstall the redirection filter. Accordingly, the failback operation may be complete and traffic may be forwarded as if the MLAG port had never been inactive. That is, since the redirection filter is removed and no MAC entries need to be flushed and re-learned, traffic may be forwarded, using the unchanged forwarding database entries, via the previously inactive port.

In the embodiment shown in FIG. 5, simplified forwarding databases entries and a simplified ACL filter are depicted. The forwarding databases entries may be unchanged from a time before an MLAG link or port failure was detected. Referring to FIG. 5, a forwarding database entry of switch 1 102 may indicate that traffic addressed to MAC1 is to be forwarded via an inactive port (e.g., port 3 (P3)). A forwarding database entry of switch 2 104 may indicate that traffic addressed to MAC1 is to be forwarded via port 4 (P4). The depicted ACL filter may indicate that traffic intended to be forward via the failed port (e.g., port 3 (P3)) is to be redirected over ISC-1 106 via port 1 (P1) to switch 2 104. Using an ACL filter in performing an improved convergence operation, it may be unnecessary to perform one or more steps of a conventional convergence operation. For example, a redirection filter may be used in lieu of performing a conventional convergence operation. In another example, a redirection filter may be used while a conventional convergence related operation (e.g., a flush or move operation) is in progress and may be removed when the operation is complete. In either example, the use of a redirection filter may decrease the amount of time needed for completing a convergence operation compared to a conventional convergence operation that does not utilize a redirection filter.

Switch 1 102 may install a redirection filter for handling traffic associated with an inactive MLAG port (e.g., port 3 (P3) of switch 1 102). As represented by an arrow in FIG. 5, a packet addressed to a MAC address (e.g., MAC1 of server 1 108) may be received at switch 1 102 while the MLAG port is inactive. Switch 1 102 may perform a forwarding database lookup using a first forwarding database for determining an egress port. The lookup may return port information associated with the inactive MLAG port. Using the egress port, an associated ACL filter may be identified. The ACL filter may indicate that traffic associated with port 3 (P3) of switch 1 102 is to be redirected to port 1 (P1). Using the ACL filter information, switch 1 102 may forward the packet over ISC-1 106 via port 1 (P1) to switch 2 104. Switch 2 104 may receive the packet. Switch 2 104 may perform a forwarding database lookup using a second forwarding database. Using the egress port identified by the lookup, switch 2 104 may forward the packet via port 4 (P4) of switch 2 104 towards server 2 110.

Figure 6:
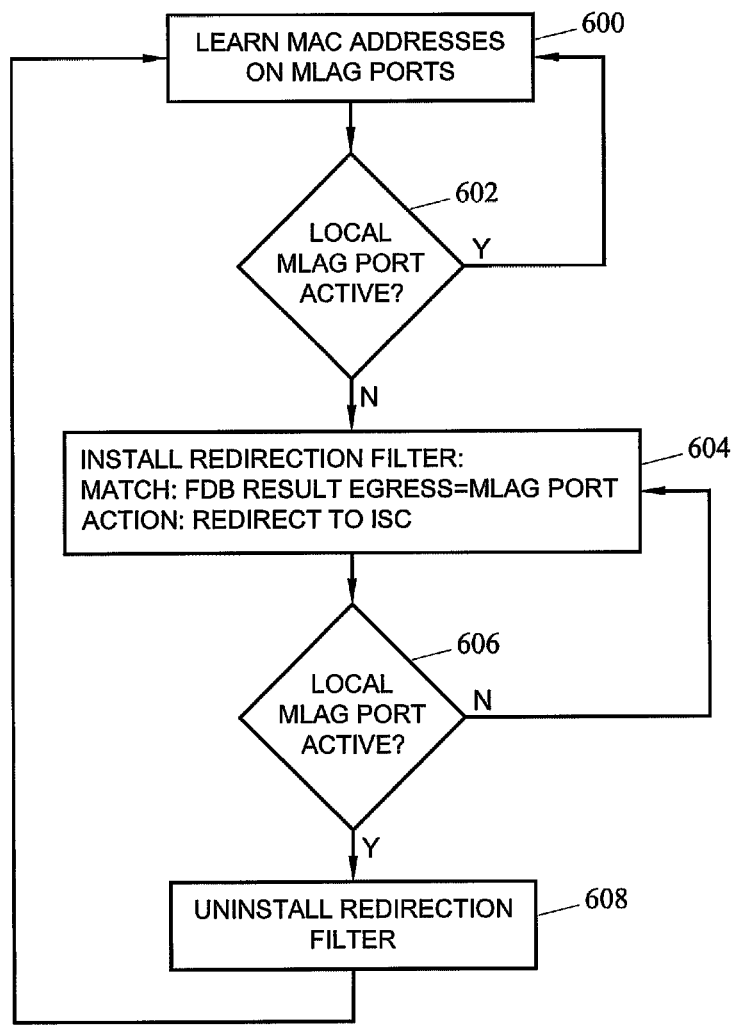
FIG. 6 is a flow chart illustrating an exemplary method for using redirection filters according to an embodiment of the subject matter described herein.

FIG. 6 is a flow chart illustrating an exemplary method for using redirection filters according to an embodiment of the subject matter described herein. In one embodiment, a packet forwarding device (e.g., switch 2 104) or a module therein (e.g., an MLAG module or an SMM of switch 2 104) may perform one or more steps of the exemplary method. Referring to FIG. 6, at step 600 MAC addresses are learned on MLAG ports. For example, switch 2 104 may learn MAC addresses a-n are to be sent via port 2 (V2) of switch 2 104. Switch 2 104 may store associations between the MAC addresses and an associated port as entries in a forwarding database. For example, a MAC forwarding database entry may include a MAC address and associated egress port for forwarding the packet. Entries may also include other information, e.g., virtual LAN (VLAN) identifiers.

At step 602, it may be determined whether a local MLAG port is active. For example, keep-alive packets may be used by one or more packet forwarding devices to determine whether an MLAG link (e.g., link 112B) or MLAG port (e.g., port 2 (P2) of switch 2 104) is active. If problems are not detected (e.g., if keep-alive packets return from a local MLAG port as expected), it may be determined that the local MLAG port is active. If the local MLAG port is active, a packet forwarding device may continue operating in a normal or steady state mode. For example, MAC addresses may continue being learned on MLAG ports.

If problems are detected (e.g., if keep-alive packets do not return from a local MLAG port), it may be determined that the local MLAG port is inactive. In response to determining that the local MLAG port is inactive, a convergence operation may be initiated. The convergence operation may be used for redirecting traffic towards an alternate active MLAG port.

At step 604, a redirection filter may be installed. For example, the redirection filter may include criteria that if a forwarding database lookup result (e.g., egress port information) for a packet matches the inactive MLAG port, the corresponding action is to redirect the packet to an ISC (e.g., via port (P1) of switch 2 104. In one embodiment, the redirection filter may be an ACL filter and may be used to override information received using a forwarding database lookup. For example, where a forwarding database lookup for packets addressed to MAC addresses a-n returns an inactive MLAG port, switch 2 104 may redirect the packets via an ISC as instructed by a redirection filter.

At step 604, it may be determined whether a local MLAG port is active. For example, keep-alive packets may be used by one or more packet forwarding devices to determine whether an inactive MLAG link (e.g., link 112B) or MLAG port (e.g., port 2 (P2) of switch 2 104) is now active. If problems are detected (e.g., if keep-alive packets do not return from a local MLAG port), it may be determined that the local MLAG port is inactive. In response to determining that the local MLAG port is inactive, the redirection filter may continue to be used to direct traffic associated with the inactive MLAG port.

If problems are not detected (e.g., if keep-alive packets return from a local MLAG port), it may be determined that the local MLAG port is now active. At step 606, in response to the local MLAG port being active, a packet forwarding device may uninstall or remove the redirection filter. In one embodiment, if forwarding database entries associated with the previously inactive MLAG port have not been flushed or moved, a packet forwarding device may be capable of forwarding traffic to the previously inactive port almost simultaneously to uninstalling the redirection filter. In another embodiment, if forwarding database entries associated with the previously inactive MLAG port have been flushed or moved, after uninstalling the redirection filter, a packet forwarding device may need to flush and re-learn MAC addresses associated with the previously inactive MLAG port or move such entries back to the forwarding database before the packet forwarding device is capable of forwarding traffic to the previously inactive port.

Figure 7:
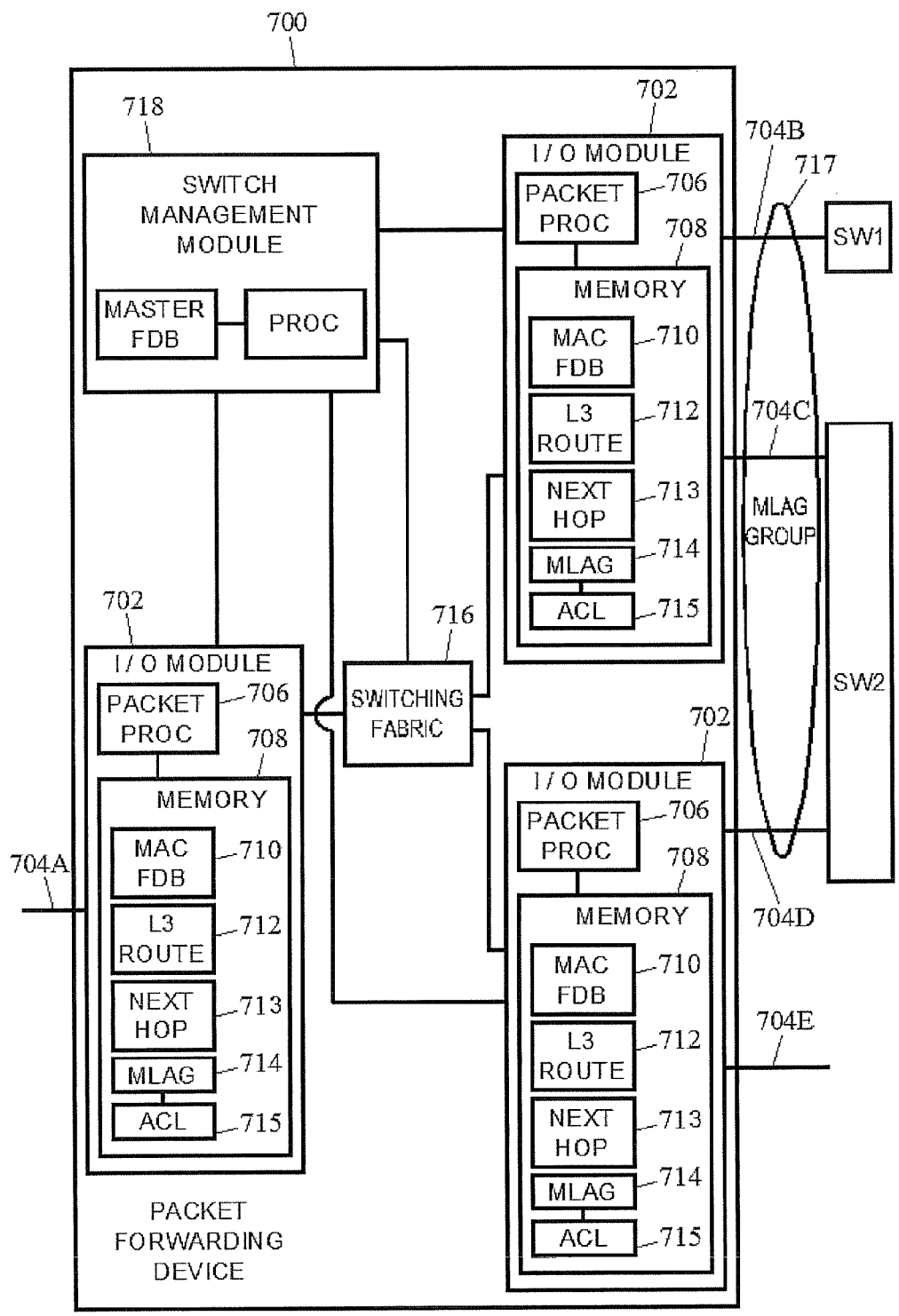
FIG. 7 is a block diagram illustrating an exemplary packet forwarding device for implementing improved MLAG convergence according to an embodiment of the subject matter described herein.

FIG. 7 is a block diagram illustrating an exemplary packet forwarding device for implementing improved multi-switch link aggregation group (MLAG) convergence according to an embodiment of the subject matter described herein. Referring to FIG. 1, packet forwarding device 700 may have layer 2 switching and layer 3 packet forwarding capabilities, where layers 2 and 3 refer to the corresponding layers in the OSI protocol stack. In one embodiment, packet forwarding device 700 may be at least one of switch 1 102, switch 2 104, server 1 108, and server 2 110.

Packet forwarding device 700 includes a plurality of input/output (I/O) modules 702, each having at least one port 704 for communicating packets to and receiving packets from connected hosts, such as servers, personal computers, routers, etc. Each I/O module 702 includes a packet processor 706 and memory 708. Each packet processor 706 performs packet forwarding operations using packet forwarding information stored in its respective memory 708. In one embodiment, packet processor 706 may be used for receiving a packet and determining that the packet is destined for a port of the packet forwarding device associated with an MLAG group.

In the illustrated example, each memory 708 includes a MAC forwarding database 710 for storing layer 2 packet forwarding information, a layer 3 longest prefix match or host route table 712 for storing layer 3 packet forwarding information, and a next hop table 713 for storing egress port, MAC address, and VLAN information. The combination of layer 3 route table 712 and next hop table 713 stores ARP bindings.

Each memory 708 also includes an MLAG module 714. MLAG module 714 may perform one or MLAG related functions. For example, MLAG module 714 may be responsible for configuration of an MLAG 717, e.g., links associated with ports 704B-C and ports of two devices (e.g., SW1 and SW2) that may be treated as a single logical link. MLAG module 714 may be also be responsible for handling MLAG traffic, e.g., redirecting and forwarding packets associated with MLAG ports.

In one embodiment, MLAG module 714 may use one or more methods for determining whether an MLAG port or MLAG link is active. For example, MLAG module 714 may initiate keep-alive messages and/or control packets for performing MLAG configuration and maintenance. MLAG module 714 may also initiate and/or perform one or more steps of a convergence operation. For example, MLAG module 714 may generate or initiate another module (e.g., a switch management module 718 or) to generate and/or install a redirection filter. MLAG module 714 may redirect, using a redirection filter, the received packet towards an active port associated with the MLAG group. MLAG module 714 may also initiate and/or perform one or more steps of a failback operation. For example, MLAG module 714 may uninstall or initiate another module (e.g., an ACL module 715) to uninstall a redirection filter in response to a reverting event.

Each memory 708 may also include an ACL module 715. ACL module 715 may perform performing one or more access control functions. In one embodiment, ACL module 715 may be used to install and uninstall a redirection policy for traffic associated with an inactive MLAG port. ACL module 715 may also be used in redirecting traffic based on the redirection policy information. For example, ACL module 715 may inform packet processor 706 or a module, such as MLAG module 714, to override forwarding database information and forward a packet using ACL filter information.

Packet forwarding device 700 also includes a switch fabric 716 that is responsible for forwarding packets between I/O modules 702 and between I/O modules 702 and switch management module 718. Switch management module 718 controls the overall operation of packet forwarding device 100. In one embodiment, switch management module 718 may provide information for MLAG and ACL related functions. For example, switch management module 718 may generate or construct a redirection filter for redirecting MLAG traffic. In one embodiment, switch management module 718 may provide a redirection filter to one or more ACL modules, e.g., a redirection filter to each I/O module 702. In addition, switch management module 718 may participate in IP routing protocols to populate layer 3 route tables 710 and may perform slowpath forwarding lookups for packets for which entries are not populated in layer 3 route tables 712.

Although the subject matter described above relates to multi-switch link aggregation group (MLAG) convergence, the subject matter described herein is not limited to MLAG convergence and can be applied to any type of logical connection failover or convergence without departing from the scope of the subject matter described herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for providing improved multi-switch link aggregation group (MLAG) convergence, the system comprising:
    a packet forwarding device comprising:
        a packet processor for receiving a packet and determining that the packet is destined for a port of the packet forwarding device associated with an MLAG group; and
        an MLAG module associated with the packet processor for determining that the port is inactive, and in response to determining that the port is inactive, performing a convergence operation, wherein the convergence operation includes redirecting, using a redirection filter, the received packet towards an active port associated with the MLAG group, wherein entries containing media access control (MAC) information associated with the inactive port in the forwarding database remain unchanged during the convergence operation, wherein traffic addressed to the inactive port associated with an MLAG group is redirected towards an active port associated with an MLAG group and, in response to a reverting event, the MLAG module is configured to remove the redirection filter such that traffic is forwarded to the previously inactive port.

2. The system of claim 1 wherein the redirection filter is an access control list (ACL) filter and is used to override information associated with a forwarding database lookup.

3. The system of claim 2 wherein the information associated with a forwarding database lookup includes port information identifying an egress port for sending the packet towards a destination.

4. The system of claim 1 wherein forwarding information associated with the inactive port in the forwarding database remains unchanged during the convergence operation.

5. The system of claim 1 wherein the reverting event includes an inactive port becoming active, a forwarding database flush operation completing, a forwarding database learn operation completing, or a forwarding database move operation completing.

6. The system of claim 1 wherein the packet forwarding device performs redirection in lieu of at least one of a forwarding database flush operation, a forwarding database move operation, and a forwarding database learn operation.

7. The system of claim 1 wherein redirecting includes sending the packet via an inter-switch connection (ISC) to a second packet forwarding device and wherein the second packet forwarding device forwards the packet via the active port associated with the MLAG group.

8. A method for improved multi-switch link aggregation group (MLAG) convergence, the method comprising:
   at a packet forwarding device:
      receiving a packet;
      determining that the packet is destined for a port of the packet forwarding device associated with an MLAG group;
      determining that the port is inactive; and
      in response to determining that the port is inactive, performing a convergence operation, wherein the convergence operation includes redirecting, using a redirection filter, the received packet towards an active port associated with the MLAG group, wherein entries containing media access control (MAC) information associated with the inactive port in the forwarding database remain unchanged during the convergence operation, wherein traffic addressed to the inactive port associated with an MLAG group is redirected towards an active port associated with an MLAG group and wherein, in response to a reverting event, the MLAG module is configured to remove the redirection filter such that traffic is forwarded to the previously inactive port.

9. The method of claim 8 wherein the redirection filter is an access control list (ACL) filter and is used to override information associated with a forwarding database lookup.

10. The method of claim 9 wherein the information associated with a forwarding database lookup includes port information identifying an egress port for sending the packet towards a destination.

11. The method of claim 8 wherein forwarding information associated with the inactive port in the forwarding database remains unchanged during the convergence operation.

12. The method of claim 8 wherein the reverting event includes an inactive port becoming active, a forwarding database flush operation completing, a forwarding database learn operation completing, or a forwarding database move operation completing.

13. The method of claim 8 wherein redirecting is performed in lieu of at least one of a forwarding database flush operation, a forwarding database move operation, and a forwarding database learn operation.

14. The method of claim 8 wherein redirecting includes sending the packet via an inter-switch connection (ISC) to a second packet forwarding device and wherein the second packet forwarding device forwards the packet via the active port associated with the MLAG group.

15. A non-transitory computer readable medium having stored thereon executable instructions that when executed by the processor of the computer control the computer to perform steps comprising:
   at a packet forwarding device:
      receiving a packet;
      determining that the packet is destined for a port of the packet forwarding device associated with an MLAG group;
      determining that the port is inactive; and
      in response to determining that the port is inactive, performing a convergence operation, wherein the convergence operation includes redirecting, using a redirection filter, the received packet towards an active port associated with the MLAG group, wherein entries containing media access control (MAC) information associated with the inactive port in the forwarding database remain unchanged during the convergence operation, wherein traffic addressed to the inactive port associated with an MLAG group is redirected towards an active port associated with an MLAG group and wherein, in response to a reverting event, the MLAG module is configured to remove the redirection filter such that traffic is forwarded to the previously inactive port.

* * * * *